(12) United States Patent
Gamet et al.

(10) Patent No.: US 8,478,752 B2
(45) Date of Patent: Jul. 2, 2013

(54) METHODS OF ACCESSING A NAVIGATION DATABASE

(75) Inventors: Pierre Gamet, Blagnac (FR); Philippe Chaix, Tournefeuille (FR)

(73) Assignee: Thales, Neuilly sur Seine (FR)

(*) Notice: Subject to any disclaimer, the term of this patent is extended or adjusted under 35 U.S.C. 154(b) by 171 days.

(21) Appl. No.: 13/132,622

(22) PCT Filed: Dec. 4, 2009

(86) PCT No.: PCT/EP2009/066399
§ 371 (c)(1),
(2), (4) Date: Jul. 22, 2011

(87) PCT Pub. No.: WO2010/063821
PCT Pub. Date: Jun. 10, 2010

(65) Prior Publication Data
US 2012/0036124 A1  Feb. 9, 2012

(30) Foreign Application Priority Data

Dec. 5, 2008 (FR) ...................................... 08 06835

(51) Int. Cl.
*G06F 17/20* (2006.01)
(52) U.S. Cl.
USPC .......................................... 707/724; 701/454

(58) Field of Classification Search
None
See application file for complete search history.

(56) References Cited

U.S. PATENT DOCUMENTS

| 4,827,419 | A | 5/1989 | Selby, III | |
|---|---|---|---|---|
| 5,848,373 | A * | 12/1998 | DeLorme et al. | 701/455 |
| 2006/0142904 | A1 * | 6/2006 | Caillaud et al. | 701/3 |
| 2008/0154493 | A1 * | 6/2008 | Bitar et al. | 701/208 |
| 2010/0198433 | A1 * | 8/2010 | Fortier et al. | 701/14 |

FOREIGN PATENT DOCUMENTS

| EP | 0978707 A2 | 2/2000 |
|---|---|---|
| WO | 2004/085964 A1 | 10/2004 |

* cited by examiner

*Primary Examiner* — Yuk Ting Choi
(74) *Attorney, Agent, or Firm* — Baker Hostetler LLP

(57) ABSTRACT

A navigation database comprises a first set of elements comprising airports, beacons and waypoints; a second set of elements comprising procedures; and a third set of elements comprising routes. The method comprises a step of creating a pair of indices comprising an index comprising the elements of the three sets; identifier, a type and a functional identifier; a first list of pointers to the memory address where the elements are stored; a pre-index comprising a list of code, each code corresponding to the first characters of each element, the codes being indexed by a family of attributes of elements; a second list of pointers to the identifier of the first element in the first index.

7 Claims, 1 Drawing Sheet

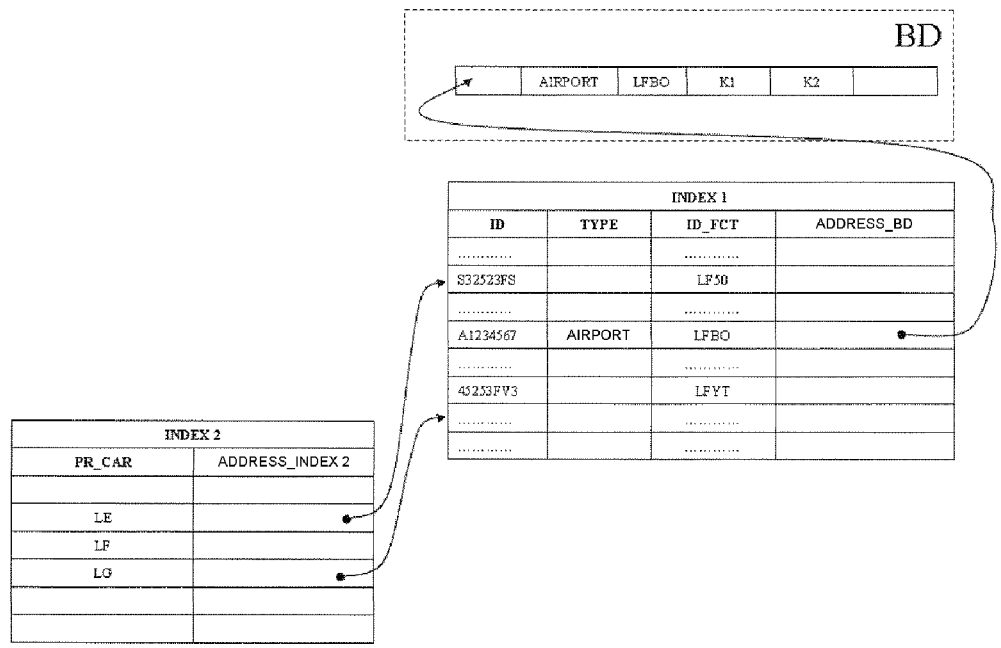

METHODS OF ACCESSING A NAVIGATION DATABASE

CROSS-REFERENCE TO RELATED APPLICATIONS

This application is a National Stage of International patent application PCT/EP2009/066399, filed on Dec. 4, 2009, which claims priority to foreign French patent application No. FR 08 06835, filed on Dec. 5, 2008, the disclosures of which are incorporated herein by reference in their entirety.

FIELD OF THE INVENTION

The present invention relates to the field of onboard databases embedded in navigation systems. More particularly, the field of the invention pertains to the particular features of the mechanisms for indexing a navigation database, accesses to the navigation data and optimization of the data access time for such a base. Generally, the field of the invention relates to large-capacity databases comprising a significant amount of data, notably aeronautical data.

BACKGROUND OF THE INVENTION

In current aircraft navigation systems, a navigation database is generally necessary in order to store notably the data relating to the flight plans, to the flight procedures, to the routes, to the airports, to the beacons and to the waypoints.

These databases require numerous accesses during a flight notably to define or modify a flight plan, engage a particular procedure such as a landing procedure, a takeoff procedure or else an approach or rejoining procedure.

When a pilot is searching for an airport for example, current databases perform either a dichotomy search or a linear search on tables of objects classed according to the search criterion.

As regards navigation databases, their size generally necessitates the use of indices. In this case, the database can allow a first search on an index followed by read-access to the objects of the database.

Numerous applications of the navigation system, such as for example the flight management system of an aircraft, also called the FMS, make it necessary to carry out numerous queries of very diverse types on the navigation database upon initialization and then during certain of an aircraft's flight phases.

Furthermore, the requirement for flight safety makes it necessary, during data exchanges between the various applications of the navigation system and the navigation database, to minimize the response times, to improve the effectiveness of the applications, to reduce the error rates and to optimize the data searches.

A known problem related to searching a navigation database on the basis of a search criterion is that there is a risk of the response times being increased if several items of information related to the objects of the database are analyzed although they are not utilized subsequently by the application.

A second problem generally encountered, when a client application uses an index in a search of the navigation database, is that access to the base requires that the targeted object be read so as to ascertain its type for example. This read-access therefore necessitates a needless indirection if the object sought is of a given type.

Another problem generally encountered is the large memory volume occupied by these indices.

Finally a problem related to the use of an index is that the index generally refers to an identifier of an object making it possible to retrieve the object from the database. It is then necessary to re-perform a search of the navigation database on the basis of the identifiers of the objects.

A limitation is therefore that of the response time of the queries to the database and of the extraction of the data sought. Notably, when certain systems are not embedded such as those of Windows, the solution which consists in indexing a maximum of data of the database makes it possible to facilitate the searches. On the other hand this solution is memory expensive for electronic systems intended to be embedded aboard an aircraft.

In other applications that are critical from the point of view of the available memory, indexation may decrease the performance of the query response times.

Moreover, a second problem is that of the right of access to the data.

SUMMARY OF THE INVENTION

The invention makes it possible to alleviate the aforementioned drawbacks.

A solution of the invention consists in establishing a method of accessing a navigation database, through the creation of pairs of indices being structured so as to optimize the searches of the navigation database. Notably, a first pre-index comprises the addresses of the objects in a second index. The second index advantageously comprises the physical addresses of the objects of the navigation database.

The invention makes it possible to optimize the ratio of the number of indices created and of the size of the database so as to decrease to the maximum the response times of the queries to the database.

Furthermore, the invention comprises a data access method implemented by an onboard navigation system making it possible when searching for an object or a collection of objects in the base, in accordance with a given criterion:
  to perform a first search in a first index on the inputs corresponding to the criterion; an application of the navigation system generating queries on the navigation database is then referred to a result corresponding to a classed subset of data of another index which lists the objects which correspond to the criteria.
  to perform a second dichotomy search on this subset.

During this dichotomy search, it is not necessary to read the database register in which the object is physically stored in order to ascertain its type. Memory accesses are therefore simplified.

The invention makes it possible to establish a phase of producing the database through the creation of at least one pair of indices.

One of the two indices created is a pre-index of the second index created. The advantage of this pre-indexation is to reduce the number of operations required in order to converge during a dichotomy search.

Furthermore, during the creation of at least one pair of indices, the invention comprises a step of creating a key which authorizes the use of the base by the onboard navigation system.

Advantageously, an embodiment of the invention includes a method of accessing a navigation database by means of an onboard computer, the navigation database being intended to be integrated into a navigation system for aircraft comprising said computer, and the navigation database comprising:

a first set of elements, called Fix values, comprising notably representations of airports, beacons and waypoints, as well as the geographical coordinates of said Fix values;

a second set of elements comprising procedures, each procedure being defined by a succession of transitions, the transitions comprising a set of maneuvers of the aircraft, the maneuvers being instructions predefined in the navigation system;

a third set of elements comprising representations of routes formed by a succession of waypoints and/or of airports.

Advantageously, the method of accessing a navigation database comprises a step of creating a pair of indices comprising:

a first alphanumeric index comprising:
  the elements of the first, second and third set;
  attributes of each element, the attributes comprising at least the identifier, the type and the functional identifier of said element;
  a first list of pointers, each pointer being associated with an element, designating the memory address where the elements are stored in the navigation database,
  the first index being ordered according to at least one type of attribute, called AT_ORD, an alphanumeric pre-index comprising:
  a list of codes, each code being unique and corresponding to the first characters of each of the data of the AT_ORD of each element of the navigation database;
  a second list of pointers, each pointer being associated with a code and pointing at the identifier, in the first index, of each first element whose AT_ORD comprises the associated code.

Advantageously, the navigation database comprises:
a fourth set of elements, the elements comprising representations of the geographical cells covering a determined expanse, the cells being tagged by geographical coordinates, the cells comprising a list of elements of the first set.

Advantageously, the method of accessing a navigation database comprises the creation:
of a second geographical index comprising:
  a list of the geographical cells;
  a third list of pointers, each cell being associated with a pointer, to the memory address where the geographical cells are stored in the database;
  the size of each list.

Advantageously, a set of pairs comprising a first index and a pre-index is created, each of the pairs of indices being ordered according to at least one type of attribute of an element of the navigation database.

Advantageously, the codes the list of codes correspond to the first two characters of each of the data of the AT_ORD of each element of the navigation database.

Advantageously, the codes of the list of codes correspond to the first three characters of each of the data of the AT_ORD of each element of the navigation database.

Advantageously, the method for creating pairs of indices of the invention comprises the creation of a starting key as header of the database readable by a computer of the navigation system.

Advantageously, a first linear search for the first characters in the elements of the pre-index determines the memory addresses of the identifiers of the first and of the last elements corresponding in the first index.

Advantageously, a second dichotomy search through a list of elements of the first index corresponding to the search criterion determines the memory address of the criterion in the navigation database.

BRIEF DESCRIPTION OF THE DRAWINGS

Other characteristics and advantages of the invention will become apparent with the aid of the description which follows, offered with regard to the appended drawings which represent:

FIG. 1: two indices of a navigation database according to the invention.

DETAILED DESCRIPTION

The invention makes it possible to produce a database comprising characteristics which simplify accesses to the data and improve the swiftness of the responses.

A first step of the production of the database is the creation of indices making it possible to simplify accesses to the data.

FIG. 1 represents two indices created according to the method of the invention, it also represents the memory register of the navigation database where an object of the base is stored.

A first index, called index 1, created is that of the list of all the objects of the navigation database.

This index comprises the identifiers of the objects, denoted ID, the type of the object, denoted TYPE, the functional identifier, denoted ID_FCT, and the pointer to the memory area of the database where the object is stored, called ADDRESS_BD, as well as optionally of other attributes, according to the embodiments.

The identifier ID of an object is a key of the database. It may involve for example the UUID identifier, the acronym standing for "Universally Unique Identifier", that is to say the object's universal number.

The type of the object can comprise notably: a route, a procedure or a FIX.

A FIX is a defined point in space generally used in aeronautics, it groups together notably airports, waypoints and beacons. Generally, a waypoint is a point in space making it possible to define a transit point of a flight plan.

According to the embodiments of the invention, the type of an object may be either one of the following elements:
a FIX;
a procedure;
a route;
or one of the following elements:
a waypoint;
an airport;
a beacon;
a procedure;
a route;
according to whether a FIX is or is not considered to be a type of an object.

The functional identifier ID_FCT designates the code of a type, it may involve for example the OACI code for an airport; Toulouse airport would be identified by the code LFBO.

Finally, the pointer ADDRESS_BD to the memory area of the database where the object is stored as well as its attributes and a memory register of a database.

The index 1, thus created, may be ordered in several ways according to the operator's or pilot's use in the queries interrogating the navigation database. The invention makes it possible notably to order this index according to the identifiers, the types of the objects or else the functional identifiers.

The preferred uses are determined on the basis of the most widely used search criteria.

During the creation of the database, the invention makes it possible optionally to create several indices, corresponding to the index 1 but ordered according to various criteria. The index used according to the search will be chosen so as to minimize the response times.

FIG. 1 represents a second index, denoted INDEX 2, comprising a list of the first characters, denoted PR_CAR, of a set of objects of the database. The INDEX 2 also comprises the physical addresses in the INDEX 1 of each first object comprising the first characters of the list.

According to the embodiments the set of the objects of the INDEX 2 comprises either:
- the set of the first characters of all the identifiers of the navigation database;
- the set of the first characters of all the types of the navigation database;
- the set of the first characters of all the functional identifiers of the navigation database;
- the set of the first characters of all the objects of the navigation database.

In one embodiment, the INDEX 2 is an indexation table on the first two characters of the criterion which will be used for the search in the database.

In other embodiments, the invention makes it possible to implement the INDEX 2 with one, two or three or more characters.

Each of the "rows" possesses the following items of information:
a character, a pair or a trio of characters.

For example, the first two characters "LF" in the INDEX 2 designates all the objects beginning with the characters "LF" of the navigation database.

The INDEX 2 also comprises each pointer to the first Object ID of the INDEX 1 comprising the first characters of the corresponding criterion.

Thus to extract the objects of the INDEX 1 beginning with the first characters of the corresponding criterion, in the example LF, the invention makes it possible:
- on the one hand to log in the INDEX 1, the physical address entered in the row of the element featuring in the INDEX 1 corresponding to the physical address of the first object of the INDEX 2 comprising the first characters;
- on the other hand to log in the INDEX 1, the physical address entered in the row of the following element featuring in the INDEX 1 corresponding to the physical address of the first object of the INDEX 2 following the last element comprising the first characters.

An advantage of the invention is that it comprises the creation of a pair of indices per search criterion.

The invention makes it possible to define a list of first characters of a first set of objects of the database of the INDEX 1 corresponding to an ordering of the INDEX 2 according to the first set of objects of the database.

Thus, the invention makes it possible for example to create several pairs of different INDEX according to the choice of the set of objects of the database. In that case, according to the search criteria an INDEX pair is favored so as to optimize the response times.

A first set of objects can comprise the TYPEs of all the objects of the navigation database.

The INDEX 2 then comprises, for example, the list of the first two characters of each TYPE and the INDEX 1 is ordered according to the TYPEs of the objects of the navigation database.

A second set of objects can comprise the functional identifiers ID_FCT of all the objects of the navigation database.

The INDEX 2 then comprises, for example, the list of the first two characters of each ID_FCT and the INDEX 1 is ordered according to the ID_FCT of the objects of the navigation database.

A third set of objects can comprise the identifiers ID of all the objects of the navigation database.

The INDEX 2 then comprises, for example, the list of the first two characters of each ID and the INDEX 1 is ordered according to the ID of the objects of the navigation database.

In this example three INDEX pairs are created.

According to the type of the accesses requested by an application requiring queries on the navigation database, other INDEX pairs may be created like the previous examples.

The invention makes it possible for example to create:
Two INDEX values for an access by UUID;
Two INDEX values for an access by identifier of Fix, a FIX being either an airport, a waypoint or a beacon.

This double INDEX system may be used for searches on various criteria, for example:
- directly on the identifier ID;
- on the name of a FIX;
- on the name of a FIX of defined type;
- on non-consecutive numbers.

An advantage of the invention is that in the creation of the INDEX values the symbolic relationships, for example the identifiers ID of the objects, are replaced with the physical addresses of the objects in the navigation database.

This resolution of relationships can be applied to other types of indexation. For example, it is also applied to geographical indexation.

In the latter example, the world being divided virtually into slabs, each slab refers the application to a list of identifiers ID. These lists of object identifiers ID are replaced with the lists of corresponding physical addresses. The number of indirections of the application is thus reduced.

The invention also makes it possible to create a starting key that only a targeted onboard application, generating queries on the navigation database, knows. This key may, for example, be added as header of the database.

The invention also comprises a method of accessing the data of the navigation database by using the previously created INDEX pairs. In the implementation of this method, an arbitrary application being intended to generate queries on the navigation database is able to use this method of access.

Access to a data item according to a given criterion is performed in several steps.

An exemplary search may be an airport search criterion, that is to say a particular TYPE of FIX, according to its OACI code, that is to say its functional identifier. "Toulouse" airport corresponds for example to the code "LFBO".

A first step comprises a search in the INDEX 2 on the first two characters of the functional identifier, in the example this may involve the first characters of the code of the pair LF.

The application then knows the first and the last record whose functional identifier begins with LF of the INDEX 1 ordered by the object functional identifiers ID.

This first step is always optional since the application implementing the access method can perform the second step directly. On the other hand, by omitting this first step, the search will require further operations in order to converge.

The second step comprises a dichotomy search optimized on the basis of a search criterion on the TYPE in the subset of objects whose functional identifier begins with the pair of characters "LF".

The application performs a dichotomy search, automatically rejecting the objects which are not of "airport" type.

The third step comprises the extraction of the data of the object sought at the physical location where the data relating to the functional identifier of the object are stored. For example, the functional identifier may be "LFBO", denoting Toulouse airport.

The invention also makes it possible to search for a collection of objects given by their respective identifier ID and on which a selection on a TYPE criterion and a geographical criterion is performed.

For each object, the following steps follow one another:
The first step comprises a search on the first characters of the identifier of the object.
The second step comprises an extraction of a set of objects whose TYPE corresponds to the search criterion.
Finally a geographical search can take place on this selection of determined objects.

An advantage of this solution is that an application generating queries on the navigation database does not need to read the geographical data of the objects whose type does not correspond to the search criterion. The number of indirections and of reads is reduced and the response times are improved.

Another advantage of the invention is related to the comfort of use and to the ergonomics facilitating the searches by way of indices corresponding notably to pilots' specific needs.

Finally, a safety-related advantage of the invention is that an onboard application generating queries on the navigation database requires the knowledge of a starting key, the latter cannot be operational without it.

This characteristic allows an improvement in the safety of such systems and in the comfort of use.

A first advantage in terms of response times is that during the search for an object through its functional identifier for example "LFBO", the application obtains directly the pointers to the first object whose identifier begins with LF and to the last object whose identifier begins with LF. The dichotomy search requires fewer iterations to converge.

The reduction in the number of iterations may be evaluated in the following manner:

Nb_Carac_Index denotes the number of indexation characters and Nb_Total_Objects the total number of objects. In an exemplary embodiment, the value of Nb_Carac_Index is equal to 40, when counting letters, digits and certain special characters.

In the case of an indexation on two alphanumeric characters, there are therefore $Nb\_Carac\_Index^2$ combinations.

By assuming a uniform distribution of the data on the various characters, a subset corresponding to a letter pair comprises on average $$\frac{Nb\_Total\_Objects}{Nb\_Carac\_Index^2} \text{ elements.}$$

The number Nb_Iter of iterations required is:

$$Nb\_Iter = \log_2(Nb\_Total\_Objects) - 2 \cdot \log_2(Nb\_Carac\_Index).$$

The number of iterations is decreased on average by $2 \cdot \log_2(Nb\_Carac\_Index)$.

A second advantage in terms of response times is that during the dichotomy search, the application can directly ascertain the type of the object without having to access the memory area where the object is physically stored. The number of indirections is thereby reduced.

In a favored embodiment, the invention comprises a third index, denoted INDEX 3, comprising data representing geographical cells. This index allows faster access to navigation database information notably included in a given region.

In a variant embodiment, for example, each of the geographical cells corresponds to an expanse of the predetermined space. This expanse may be defined by a width and a length expressed in degrees and a position.

For example, a geographical cell may be an expanse of 1° in latitude by 1° in longitude. The Earth is then composed of 64800 cells.

The invention makes it possible to create an INDEX 3 comprising the list of all the cells and the entry registering the position of the memory address where the cell is stored in the navigation database.

In one embodiment, each row of the INDEX 3 defining a geographical cell comprises a data item defining the size of the list of the elements included in said geographical cell.

Thus, it is possible to access the memory area where the geographical cell is stored in the navigation database by comparison of the size of the number of elements included in a geographical area and a known reference position of a geographical area in the memory.

Finally, the invention presents another embodiment, comprising the definition of a set of predefined procedure such as notably:
a landing;
an approach procedure;
a takeoff procedure;
a procedure for rejoining a flight plan;
a standby procedure;
etc.

Each procedure comprises a set of transitions, each transition being defined by a set of LEGs. A LEG is a given maneuver of an aircraft. They are generally defined with respect to at least one FIX.

Examples of predefined LEGs are:
a turn with respect to a reference point given by a FIX;
the rejoining of a FIX;
etc.

The invention makes it possible to relate each of the procedures to a set of transitions, themselves each being related to a set of LEGs, the LEGs being defined in the navigation database.

The invention makes it possible to define in each relationship between respectively:
a procedure and the transitions included in said procedure;
a transition and the LEGs included in said transition;
a LEG and the FIXes included in said LEG;
the physical addresses of the elements, the elements comprising transitions, LEGs and FIXes.

Thus a procedure can comprise:
a first transition comprising a first physical address in the navigation database;
a second transition comprising a second physical address in the navigation database and;
finally a third transition comprising a first physical address in the navigation database.

The relationships which relate a procedure to the physical addresses of each element of said procedure make it possible to reduce the information access times during the execution of the procedure. The elements of a procedure comprise notably transitions, LEGs and FIXes.

A transition can comprise a succession of LEGs and their physical addresses in the navigation database.

Likewise, a LEG can comprise a FIX and the physical address of this FIX in the navigation database.

An advantage of the database access method is that each pair of indices created is a means of accessing the navigation database making it possible to reduce the response times of aeronautical applications necessitating queries of the navigation database.

Furthermore, another advantage is that the creation of indices responds to a requirement to decrease the processing by the onboard computer. The navigation database is a base comprising a very large amount of data of different nature and accesses to the database necessitate numerous operations that may decrease the effectiveness of aeronautics missions. In certain applications used in aeronautics, by way of example certain navigation bases can comprise 600000 to 800000 elements.

The creation of indices then makes it possible to reduce a certain number of operations which are no longer necessary according to the structures and the number of indices created which make it possible to optimize the queries.

An advantage of the invention is notably to optimize the compromise between the size of the navigation database and the number of indices created so as to reduce the response times. Notably, the navigation system including the navigation database being onboard generally within an aircraft cockpit, the issue of the physical memory is paramount so as not to penalize the queries on the database in terms of response time. The "index everything" or "index nothing" solutions are, consequently, not appropriate to a configuration of use where the systems are onboard.

Finally, the personnel using these databases and the indices created according to the invention are skilled personnel taught with such tools requiring training in the use of navigation databases. The indices created according to the invention are therefore created so as to meet the requirements of trained and experienced personnel.

The invention claimed is:

1. A method of accessing a navigation database using an onboard computer, the navigation database being integrated into a navigation system for an aircraft comprising said onboard computer, the navigation database comprising:
   a first set of elements comprising representations of airports, beacons and waypoints;
   geographical coordinates of said first set of elements;
   a second set of elements comprising procedures, each of the procedures being defined by a succession of transitions, the transitions comprising a set of maneuvers of the aircraft, the maneuvers being instructions predefined in the navigation system; and
   a third set of elements comprising representations of routes formed by a succession of the first set of elements, the method comprising:
   creating a first alphanumeric index comprising:
      the elements of the first, second and third set;
      attributes of each element, the attributes comprising an identifier, a type, and a functional identifier of each element;
      a first list of pointers, each pointer being associated with an element, and designating a memory address where the elements are stored in the navigation database, and
      the first alphanumeric index being ordered according to at least one type of attribute; and
   creating an alphanumeric pre-index comprising:
      a list of codes, each code being unique and corresponding to a first character of each of the data of the at least one type of attribute of each element of the navigation database; and
      a second list of pointers, each pointer being associated with a code and pointing at the identifier, in the first alphanumeric index, of each element associated with the code.

2. The method of accessing a navigation database according to claim 1, the navigation database further comprising:
   a fourth set of elements, the elements comprising representations of geographical cells covering a determined expanse, the geographical cells being tagged by geographical coordinates, and the geographical cells comprising a list of elements of the first set, and
   the method further comprising:
   creating a second geographical index comprising:
      a list of the geographical cells;
      a third list of pointers, each geographical cell being associated with a pointer to the memory address where the geographical cells are stored in the database; and
      a size of each list.

3. The method according to claim 1, wherein a set of pairs comprising a first index and a pre-index is created, each of the pairs of indices being ordered according to at least one type of attribute of an element of the navigation database.

4. The method according to claim 1, wherein the codes of the list of codes correspond to the first two characters of each of the data of the at least one type of attribute of each element of the navigation database.

5. The method according to claim 1, wherein the codes of the list of codes correspond to the first three characters of each of the data of the at least one type of attribute of each element of the navigation database.

6. The method according to claim 1, further comprising:
   creating a starting key as a header of the navigation database readable by a computer of the navigation system.

7. The method according to claim 3, wherein:
   a first linear search for the first characters in the elements of the alphanumeric pre-index determines the memory addresses of the identifiers of the first and of the last elements corresponding in the first index; and
   a second dichotomy search through a list of elements of the first index corresponding to the first linear search determines the memory address of criterion in the navigation database.

* * * * *

UNITED STATES PATENT AND TRADEMARK OFFICE
CERTIFICATE OF CORRECTION

PATENT NO.        : 8,478,752 B2                                      Page 1 of 1
APPLICATION NO.   : 13/132622
DATED             : July 2, 2013
INVENTOR(S)       : Gamet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this
Eighth Day of September, 2015

Michelle K. Lee
*Director of the United States Patent and Trademark Office*